(12) United States Patent
Rhodes et al.

(10) Patent No.: US 10,186,018 B2
(45) Date of Patent: Jan. 22, 2019

(54) DETERMINING DISPLAY ORIENTATIONS FOR PORTABLE DEVICES

(71) Applicant: IMDb.com, Inc., Seattle, WA (US)

(72) Inventors: Christopher Guy Rhodes, North Hills, CA (US); Hilliard Bruce Siegel, Seattle, WA (US)

(73) Assignee: IMDB.COM, INC., Seattle, WA (US)

( * ) Notice: Subject to any disclaimer, the term of this patent is extended or adjusted under 35 U.S.C. 154(b) by 268 days.

(21) Appl. No.: 15/147,784

(22) Filed: May 5, 2016

(65) Prior Publication Data

US 2016/0247261 A1    Aug. 25, 2016

Related U.S. Application Data

(62) Division of application No. 13/449,214, filed on Apr. 17, 2012, now Pat. No. 9,342,143.

(51) Int. Cl.

| | |
|---|---|
| *G06T 3/60* | (2006.01) |
| *G06F 3/01* | (2006.01) |
| *G01C 15/00* | (2006.01) |
| *G06F 3/038* | (2013.01) |
| *G06F 3/0346* | (2013.01) |

(Continued)

(52) U.S. Cl.
CPC ............. *G06T 3/60* (2013.01); *G01C 15/00* (2013.01); *G06F 1/1686* (2013.01); *G06F 1/1694* (2013.01); *G06F 3/005* (2013.01); *G06F 3/011* (2013.01); *G06F 3/013* (2013.01); *G06F 3/038* (2013.01); *G06F 3/0346* (2013.01);

(Continued)

(58) Field of Classification Search
None
See application file for complete search history.

(56) References Cited

U.S. PATENT DOCUMENTS

| | | | |
|---|---|---|---|
| 8,797,441 B2 | 8/2014 | Patel | |
| 9,146,624 B2 * | 9/2015 | Zhao | ........................ G06F 3/012 |

(Continued)

FOREIGN PATENT DOCUMENTS

WO    WO201230265    12/2010

OTHER PUBLICATIONS

"Non Final Office Action dated Oct. 1, 2015" received in U.S Appl. No. 13/449,214.

(Continued)

*Primary Examiner* — Aditya Bhat
(74) *Attorney, Agent, or Firm* — Hogan Lovells US LLP

(57) ABSTRACT

An electronic device can utilize image information to determine a proper orientation with which to render content. In some embodiments, a camera of a computing device can capture one or more images to attempt to determine a relative location (or direction) of a user by identifying a feature of a user or by using objects in the image to determine a likely direction of a user. Based at least in part on this information, as well as information from position and motion sensors of the device in some embodiments, a device can determine a relative position of a user, and can cause content to be rendered by the device with an orientation that is appropriate for that position, where the orientation can also depend upon the type of content or other such factors. Such an approach can determine proper orientations in situations where conventional sensor-based approaches are not sufficient.

20 Claims, 6 Drawing Sheets

(51) Int. Cl.
  *G06F 3/00*     (2006.01)
  *G06F 1/16*     (2006.01)
  *H04N 13/383*   (2018.01)
(52) U.S. Cl.
  CPC ............... *G06F 2200/1637* (2013.01); *G06T 2207/30244* (2013.01); *H04N 13/383* (2018.05)

(56) References Cited

U.S. PATENT DOCUMENTS

2008/0181502 A1 * 7/2008 Yang .................. G06F 1/1626
                                                    382/181
2010/0066763 A1   3/2010 MacDougall
2010/0295782 A1  11/2010 Binder

OTHER PUBLICATIONS

"Notice of Allowance dated Feb. 2, 2016" received in U.S Appl. No. 13/449,214.

* cited by examiner

DETERMINING DISPLAY ORIENTATIONS FOR PORTABLE DEVICES

CROSS-REFERENCE TO RELATED APPLICATIONS

The present application is a divisional of, and claims priority to allowed U.S. application Ser. No. 13/449,214, entitled "DETERMINING DISPLAY ORIENTATIONS FOR PORTABLE DEVICES," filed Apr. 17, 2012, which is incorporated herein by reference for all purposes.

BACKGROUND

People are increasingly utilizing portable electronic devices to perform various types of tasks. Many of these devices include rectangular display screens which can have significantly different heights and widths, where different orientations of the device can be advantageous for different functions. For example, a user might prefer to view documents in a portrait orientation but view movies in a landscape orientation. Sometimes, a user might change an orientation of a device in order to switch between portrait and landscape orientations, such as where a height or width of a piece of content makes it easier to view in a particular orientation. In order to enable the user to easily change the display orientations, a portable computing device can include sensors such as gyroscopes or accelerometers to detect changes in orientation of the device, which then can be used to adjust a display of content on a display screen of the device. In certain orientations of the device, however, the sensor data is not adequate to determine how to properly orient the displayed content. A user setting a device down flat on a table or holding the device with the screen facing upward, for example, can cause the device to change the orientation of displayed content, as neither landscape nor portrait orientation is dominant with respect to gravity, which often is used as a determining factor for proper orientation. If the user rotates the device with the screen facing up in order to adjust the user's view, the device may again change orientation when the device is not certain of the proper orientation but detects movement of the device. These unexpected rotations or changes in orientation can be frustrating for a user, or can at least degrade the user experience.

BRIEF DESCRIPTION OF THE DRAWINGS

Various embodiments in accordance with the present disclosure will be described with reference to the drawings, in which.

DETAILED DESCRIPTION

Systems and methods in accordance with various embodiments of the present disclosure may overcome one or more of the aforementioned and other deficiencies experienced in conventional approaches to displaying content using an electronic device. In particular, various approaches discussed herein can utilize one or more cameras on a computing device to attempt to determine a current viewing angle or direction of a user, for purposes of determining a proper orientation for content to be displayed on a display screen of the computing device. In some embodiments, a computing device can capture images and/or video at certain times to attempt to locate features such as the eyes or head of a user, to attempt to determine a proper orientation. In at least some embodiments, a device can utilize at least one motion sensor to assist with orientation determinations, either as an alternative to, or in conjunction with, the captured image information. Further, in situations where a user cannot be located, a device in accordance with various embodiments can attempt to determine a relative orientation of one or more objects or features within a field of view of a camera on the device, and use this relative orientation information to attempt to determine an orientation with which to display content on a display element of the device.

Various other applications, processes, and uses are presented below with respect to the various embodiments.

Figure 1A:
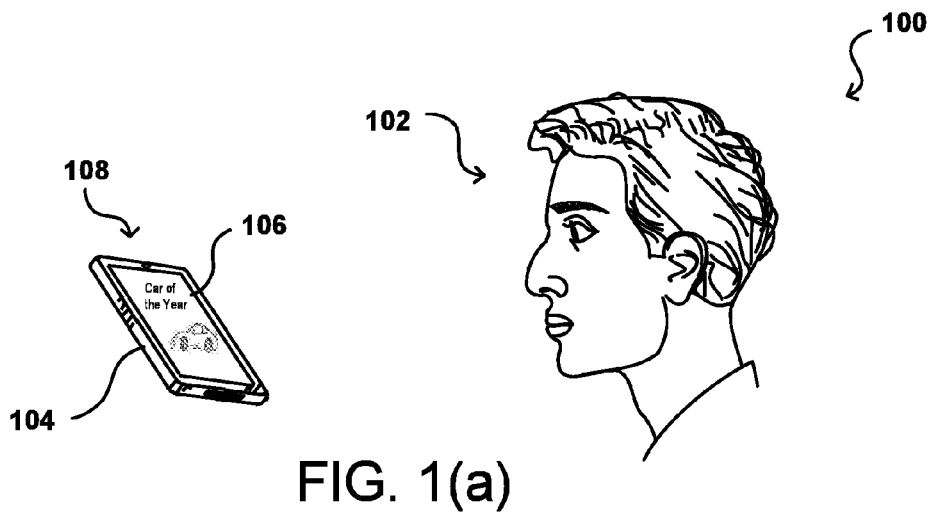
FIGS. 1(a) and 1(b) illustrates an example of a user viewing content displayed by a computing device in different orientations.
Figure 1B:
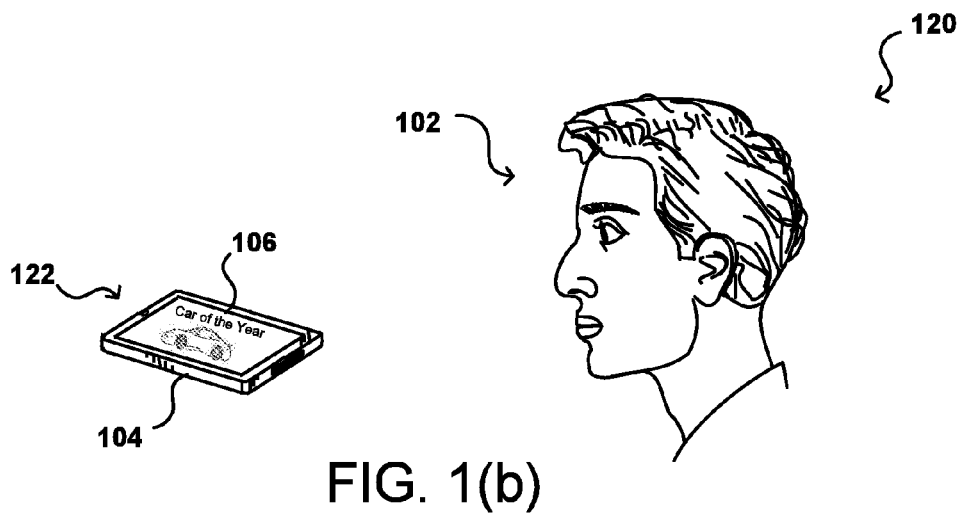

FIGS. 1(a) and 1(b) illustrate an example situation wherein a user 102 is viewing content displayed on a display screen 106 of a computing device 104. Although a portable computing device (e.g., a smart phone, an e-book reader, or tablet computer) is shown, it should be understood that various other types of electronic device that are capable of processing input and/or rendering content can be used as well in accordance with various embodiments discussed herein. These devices can include, for example, notebook computers, personal data assistants, video gaming consoles or controllers, smart televisions, and portable media players, among others. As illustrated, the user 102 in FIG. 1(a) has the computing device 104 held and/or positioned in an orientation, or with a bearing, that could be described as at least partially "upright," such that there is a single edge of the device that could be described as the "upper" edge in that orientation. The rectangular display screen 106 in this example has a longer screen dimension (e.g., height) and a shorter dimension (e.g., width), and in this orientation the longer dimension corresponds most dominantly to the "upward" direction, such that the device can be determined to be positioned with the screen in a "portrait" orientation as known in the art. Accordingly, content 108 displayed on the screen can be rendered in a portrait orientation, with the top of the image being rendered towards the "top" of the display screen in the current orientation. It should be understood that terms such as "top" and "left" are used for purposes of convenience and ease of explanation, and should not be interpreted as requiring specific orientations unless otherwise stated herein. A sensor such as an accelerometer or electronic compass can determine that the device was moved into a portrait orientation and/or that the device is in a portrait orientation by determining the direction of gravitational pull with respect to the device. When a user changes the physical orientation, such that the shorter dimension corresponds most dominantly to the "upward" direction, the device can detect the motion and/or change in direction of gravity and can determine that content displayed on the device should be switched to be rendered in a "landscape" orientation corresponding to the current orientation of the device.

In order to determine whether the content displayed on the display screen should be in a portrait or landscape (or other) orientation, however, the device in at least some embodiments needs to be able to determine the current physical orientation of the device. When a device is placed in an orientation such as that illustrated in FIG. 1(b), a "primary" plane of the display screen 106 is substantially parallel to the ground. Accordingly, neither screen dimension corresponds dominantly (i.e., with at least a minimum amount or level of certainty) to the "upward" direction. Thus, a device using a conventional sensor-based orientation approach may not be able to determine whether to properly display the content with a landscape or portrait orientation. As illustrated in FIG. 1(b), the device 104 has determined that, based on the way the device was placed on the table or other such information, the content should be rendered in a landscape orientation 122. As can be seen, however, the user 102 is still positioned relative to the device such that the user would likely prefer the content to be rendered in portrait orientation. Thus, the user must make some motion or provide some input to the device in order to change the orientation back to portrait orientation. Such changes can potentially be frustrating to a user if occurring relatively frequently.

There are also cases where a user might not want the device to change the orientation of displayed content based only on the orientation of the device. For example, a user might be lying on the couch holding the device, where the user's head is positioned at an angle and not positioned as if the user is "sitting up straight." Thus, even though the device might be positioned with the shorter dimension corresponding primarily to the upward direction, the user might prefer that the device display the content in a portrait orientation than a landscape orientation. Thus, it can be desirable to also account for the relative orientation of the user's head or eyes when determining the proper display orientation.

Figure 2:
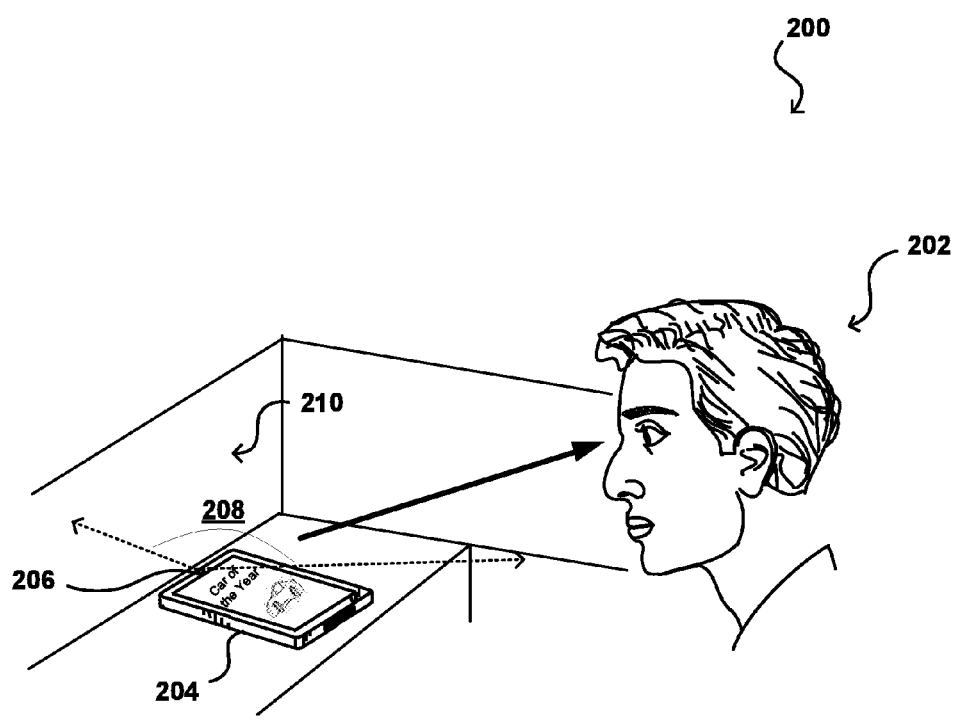
FIG. 2 illustrates and example situation wherein a computing device is able to use information about its surroundings to determine a proper display orientation in accordance with various embodiments.

Accordingly, systems and methods in accordance with various embodiments discussed herein can utilize image information to attempt to determine a proper orientation for content to be displayed by a computing device. For example, FIG. 2 illustrates an example situation 200 wherein a user 202 is viewing content displayed on a display screen of a computing device 204. In this example, the computing device is positioned on a desk with the display screen facing up, such that the device may not be able to determine whether a portrait or landscape display orientation would be appropriate. In this example, however, the computing device has a camera 206 on the same side of the device as the display screen (although other positions can be utilized as well within the scope of the various embodiments). Within a field of view 208 of the camera are multiple objects that software executing on (or in communication with) the device can utilize to determine a proper orientation for the content to be displayed.

As a first such object, the camera is able to capture information showing a relative direction of the face, head, and/or eyes of a user 202. In at least some embodiments, an orientation determining algorithm can first attempt to locate a user in the captured image information. Various image matching, feature locating, contour matching, or other such algorithms can be used to locate a head or other feature of a user in a captured image as known for purposes such as auto-focusing cameras and the like. In one embodiment, a device can attempt to locate a user's eyes, in order to determine the relative orientation of the user's head (including any tilt or rotation) for purposes of lining up the orientation with the orientation of the user's eyes. If the device cannot find a user's eyes, in at least one embodiment, the device can attempt to at least locate the user's head or another such feature of the user, which can provide at least the relative direction of the user, which in many cases will be sufficient to enable a determination of the proper orientation. In at least some embodiments, information from a gyroscope or other such sensor of the device can be combined with the image information to attempt to make a more accurate orientation determination.

If the device is not able to locate a user in the image information, such as where the user is viewing the device from a location outside a field of view of a camera of the device, an orientation determining algorithm can attempt to determine an appropriate orientation by analyzing a relative orientation of one or more objects within that field of view. For example, in FIG. 2 the camera is able to capture an image of a cubicle wall 210 that is close to one edge of the computing device 204. The device can also look to corners visible in the ceiling, orientations of doors and windows, and other such information to attempt to determine information about the device's potential orientation to a user based on the geometry of the surroundings. In FIG. 2 the device can determine that it is close to the cubicle wall, which can be used to infer at least that that the user is not in the direction of the wall. If the device is further able to view the two adjacent walls of the cubicle, the device can determine that the user is most likely in a position near the position of the user 202 in the figure, and can set the display orientation accordingly.

Various approaches such as those described above utilize image capture to determine an appropriate orientation for content to be displayed. In addition to performing the image capture and analysis, the device also may need to provide illumination in at least some circumstances. For example, the device might use information from at least one light sensor to determine an amount of ambient light near the device, and if necessary might activate a white light LED or other such element to assist with imaging. Similarly, if infrared (IR) imaging is being used, such as to locate the eyes of the user in retro-reflection, an IR emitter might be activated to provide for the reflection. Such approaches can utilize a not-insignificant amount of power, particularly for small portable devices. Accordingly, it can be desirable in at least some embodiments to minimize the amount of imaging needed to provide for orientation determinations.

In at least some embodiments, a device can utilize a process running in the background that only periodically attempts to determine orientation when the device has not been moved, or shortly after a movement. This can include waiting a short period of time for the device position to settle and then taking at least one image to attempt to make an orientation determination. In some embodiments, a device can first attempt to determine an appropriate orientation using an accelerometer, gyroscope, compass, inertial sensor, or other such component that can draw relatively little power, particularly when the device is not in motion. If the device is able to determine an appropriate orientation with at least a minimum level of certainty, for example, the device might not activate image capture for orientation determining purposes. If images are captured for other purposes the device might, in some embodiments, use that information to attempt to improve the confidence in a current determination by locating a user, etc. If the device is unable to determine an appropriate orientation with at least a minimum level of certainty, such as where the device is flat on a table, tilted to not have a dominant orientation, or in a moving vehicle on a winding road, for example, the device might activate an image capture and analysis process to attempt to determine the relative orientation of a user or object to attempt to improve the determination to at least the minimum level of confidence. If the device still is unable to make an orientation determination with at least the minimum level of confidence, however, in various embodiments the device can leave the content displayed in its current orientation or use the last orientation that was determined with at least the minimum threshold level of confidence, or another such value or criterion.

Figure 3A:
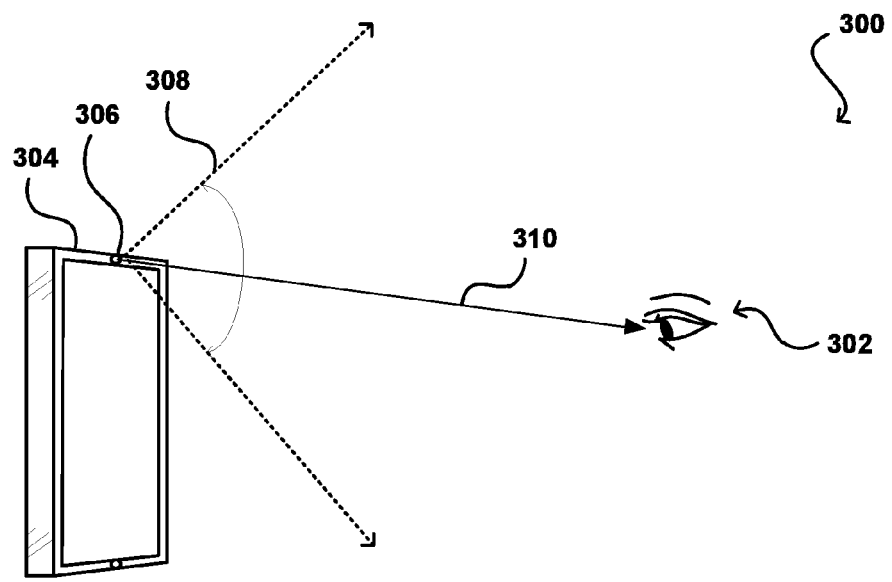
FIGS. 3(a) and 3(b) illustrate an example process for determining a viewing direction of a user that can be utilized in accordance with various embodiments.
Figure 3B:
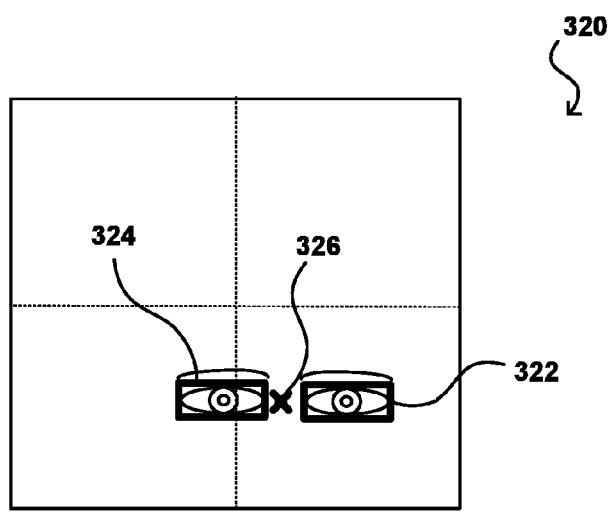

FIGS. 3(a) and 3(b) illustrate an example approach to determining the relative position and/or perspective of a user that can be used to determine an appropriate orientation with which to render content in accordance with various embodiments. In this example, one or more of the user's eyes 302 is detected in image information captured by a camera 306 of a computing device 304 when at least a portion of the user's head is within the field of view 308 of the camera. In many embodiments, where the device is looking for a viewing direction, a single camera can be sufficient to provide that direction. In other embodiments where more accurate corrections are desired, stereo imaging using two cameras, or another such approach that provides information in three dimensions (or otherwise including distance) can be used to determine the position of the user's eyes in three dimensions, which can help to determine more accurate adjustment vectors based at least in part upon the distance to the user's eyes. In at least some embodiments, determining the relative direction to any user feature can be sufficient to provide for at least some level of orientation determination.

In some embodiments, the camera 306 can be a video capture element capable of capturing a substantially continuous stream of image information, at least over a specified period of time. Since it can be very resource intensive to process the entire video stream using facial detection algorithms or other such processes, various approaches can instead utilize a less robust algorithm, such as a pattern matching algorithm, to attempt to identify the presence of a person's head or other such feature in the image stream. For example, a pattern matching algorithm can look for a contour or shape that matches the shape of a human head within a specified level or range of certainty. Various other approaches to identifying a feature in an image, such may include feature detection, facial feature extraction, feature recognition, stereo vision sensing, character recognition, attribute estimation, or radial basis function (RBF) analysis approaches, are well known in the art and will not be discussed herein in detail. Upon detecting such a shape or contour, the device can track a relative position or area in the captured image information corresponding to the user's head. Approaches for detecting and tracking shapes or contours are known in the art and as such will not be discussed herein in detail. In at least some embodiments, the detection of a user's head can cause at least one perspective determining process to be activated, or can at least trigger a portion of a relative position determining process. In some embodiments, a computing device can have at least one infrared (IR) emitter and receiver, or at least one IR transceiver, operable to transmit IR radiation and detect IR reflected back from one or more objects within a field of view of the IR receiver. As known in the art, the human eye reflects IR radiation differently than the rest of the human head, such that the presence and/or position of a user's eyes can quickly be detected and/or located by analyzing a captured IR image. Such information can help determine the presence of a user's head without requiring significant image processing, and can also help improve perspective determinations in at least some embodiments.

In FIG. 3(b), a similar approach can be used to locate the user's eyes or another such feature. In this example 300, a recognition algorithm might first analyze the captured image 320 to locate a region including a user's head, to reduce the amount of image information that needs to be analyzed. On a reduced portion or an entire image, for example, a pattern recognition algorithm or other process (e.g., IR recognition) discussed or suggested above can be used to locate one or more eyes of the user in the image information. In addition to the algorithms discussed above, other approaches for locating an iris or pupil of a user, such as by monitoring infrared reflection, can be utilized as well within the scope of the various embodiments. In this example, a detection algorithm finds and tracks the regions 322, 324 of the user's eyes in the captured video information. Based at least in part upon these regions, the device can determine a point 326 between those regions that can correspond to the user head or eye "location" used to determine the perspective of the user.

As illustrated in this example, both eyes of the user might be able to be located in the captured image information. Depending on factors such as the desired level of sensitivity and distance between the user and the device, however, such information can impact the accuracy of the input position determinations. For example, a vector from the user's right eye through the display element might intersect the touch sensitive surface at a substantially different location than a vector from the user's left eye, which can result in erroneous shift determinations. Approaches in accordance with various embodiments can take advantage of the fact that the human brain combines and processes information from both eyes such that the user views the device from a "single" point of view. Thus, the software can attempt to determine an intermediate point 326 between the user's eyes to use as the user's point of view. Various other approaches can be used as well, such as are discussed later herein.

Figure 4:
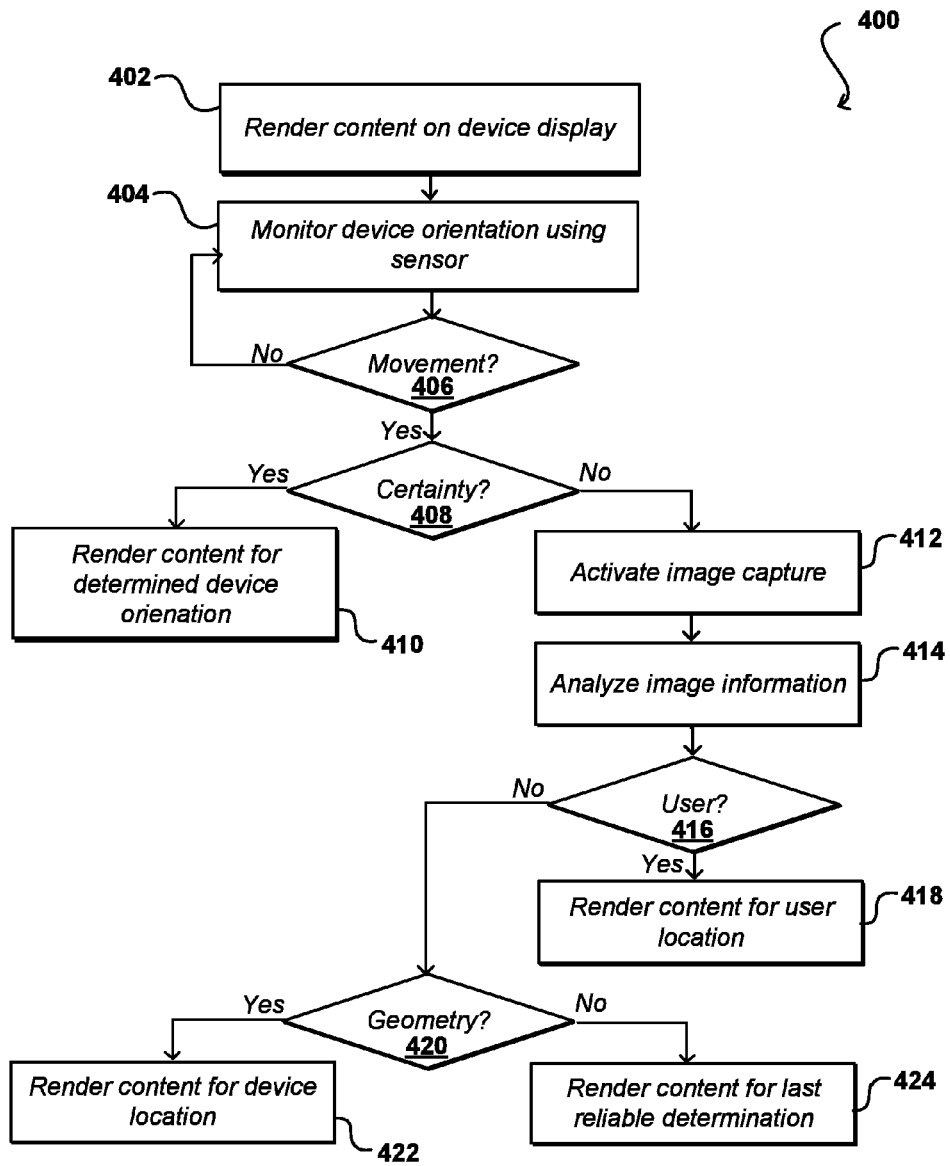
FIG. 4 illustrates an example process for determining a proper display orientation that can be used in accordance with various embodiments.

FIG. 4 illustrates an example process 400 for determining an orientation for displaying content that can be used in accordance with various embodiments. It should be understood that, for any process discussed herein, there can be additional, fewer, or alternative steps performed in similar or alternative orders, or in parallel, within the scope of the various embodiments unless otherwise stated. In this example, content is determined that is to be rendered 402 on a computing device. In some embodiments, content can initially be displayed in a default orientation, such as portrait orientation, while the device can attempt to make an orientation determination before rendering content in other embodiments. In this example, the device can monitor 404 its orientation using a sensor such as an accelerometer or electronic compass, for example, and can continue to monitor as long as movement of the device is not detected. If movement is detected 406 in this example, the device can attempt to determine the correct orientation at which to display content based on the current sensor data. If the device is able to make such a determination with at least a minimum amount of certainty 408, the content can be rendered 410 with the determined orientation. In some embodiments, this can include not only using current sensor data but tracking a change in sensor data over time to attempt to predict an orientation from the path of motion. If the sensor data is not sufficient to determine an orientation with the minimum amount of certainty, an image capture process can be activated 412 on the computing device. In various embodiments, this can include capturing a single image, series of images, video, or other such information, using a single camera, multiple cameras, or other such imaging components. The captured image information can be analyzed 414 to attempt to locate one or more features or objects within a field of view of the camera of the device.

In this example, software executing on the computing device can attempt to locate at least one feature of a user in the image information. If an appropriate feature of a user is located 416, the content can be rendered 418 with an orientation that is appropriate for that user position (assuming a minimum level of confidence can be reached). This can include, for example, determining a relative orientation of the user's eyes, a relative direction of a user's head, or other such information. If a user cannot be located, or if a user feature cannot be located that provides a sufficient level of confidence in the orientation determination, software executing on the device can attempt to determine a likely orientation based at least in part upon the geometry of one or more objects or features visible in the captured image data. In some embodiments the user and geometry analyses can be performed concurrently and/or using the same algorithm. If the software is able to determine or predict a likely proper orientation based upon the geometry information 420, the device can render content for that orientation 422. If an orientation determination still cannot be made with at least a minimum level of certainty or confidence, the content can be rendered using the last orientation for which the minimum level of certainty was at least met. In some approaches the best guess is used for orientation determinations even if the determination is only slightly more likely than the alternative orientation. Various other approaches can be used as well within the scope of the various embodiments. Further, as discussed above, a device might not include or utilize a device sensor, and might instead utilize just image information to attempt to determine a proper orientation in at least some embodiments.

It should be understood that such approaches can be used to select between more than two appropriate orientations for content to be displayed. For example, a display element might not be rectangular or otherwise include two primary dimensions (or four, if both directions of a dimension are considered). Further, the content to be displayed may be three-dimensional, such that the amount of disparity to render for different portions of the content can depend at least in part upon the viewing location or perspective of the user. Further, if the display is to appear to show three-dimensional objects rendered through a two-dimensional screen, the amount of distortion to apply to make the item appear realistic to the user can depend upon the precise viewing angle. Further still, holographic displays and other multi-directional content can also benefit from aspects of the various embodiments.

Additional techniques can be utilized as well to attempt to determine a proper orientation with which to display content. For example, a computing device might have two or more microphones that can be used to attempt to triangulate the relative position of an audio source, such as a user of the device. In at least some embodiments, the device can utilize voice recognition to ensure that the audio corresponds to an authorized or recognized user of the device, as may be particularly useful when there are multiple persons within an audible distance of the device. In some embodiments, a device can attempt to determine that a user is no longer holding the device in order to attempt to assist with the orientation determination. For example, a device can use a light sensor to detect when the device has been placed in a pocket, backpack, or other such location, or has been covered by an object. Such information can also be used to stop any orientation determination from occurring until a state of the device environment changes, such as when the device is taken back out of that location. A device can also use a heat sensor or touch sensitive material to determine that the user is likely no longer holding the device. In at least some embodiments, such input can at least be used to provide input to an orientation prediction algorithm with the user cannot be located in the captured image information.

In some embodiments, the device can distinguish between multiple persons positioned within a field of view of at least one camera of the device. For example, a device might be positioned on a table around which there are four people. If the device is able to capture image information of two or more of the people, a facial recognition algorithm or other such process can be used to attempt to identify which of those people is a current user of the device. Accordingly, the orientation of the content to be displayed can be based at least in part upon the determined location of the user of the device (unless otherwise indicated to the device that content should be rendered with an orientation for one of the other persons). Such a process might only be activated if multiple persons are detected in a field of view of the device, in order to conserve resources on the device. Further, a user might hand his or her device to a friend who is not recognized by the device. If the friend is holding the device towards the friend's face without anyone else in the view, or with the friend being the dominant face in the view, the device can use the friend's face to determine the proper orientation.

It is possible that some users may not be comfortable with the idea of a computing device taking pictures of the user without the user's specific instructions. In at least some embodiments, the image information can be buffered only long enough to make a location determination, after which time the image information is deleted. In some embodiments, a specific camera or set of components can be used for position determination such that the image information is unable to be stored for subsequent retrieval or transmitted to another location. In still other embodiments, a low resolution camera can be used that is sufficient for location determinations, but insufficient to obtain a clear view of the user. For example, a process searching for IR reflections of a user's pupils may be able to be very low resolution, as any reflection of a certain type can be indicative of the position of the user. Further, a low resolution IR image can provide very little actual image information about of the user. In some embodiments, a low resolution signature or model of the user can be generated such that user identification can be performed using the low resolution camera assembly as well, since orientation requires a lower level of certainty of user identity than secure operations, for example.

Further, while many of the examples herein relate to portable computing devices, it should be understood that many types of display can benefit from aspects of the various embodiments. For example, advertising in public spaces can include displays of content rendered on a ceiling, sidewalk, billboard, or other such location. In at least some situations it can be desirable to render the content based at least in part upon a direction in which a person is approaching the display. In at least some embodiments, the content also can be anamorphically distorted such that the display looks realistic from the point of view of a particular user, which can update as the user moves within the vicinity of the display. Various other such displays can be used as well within the scope of the various embodiments.

Figure 5:
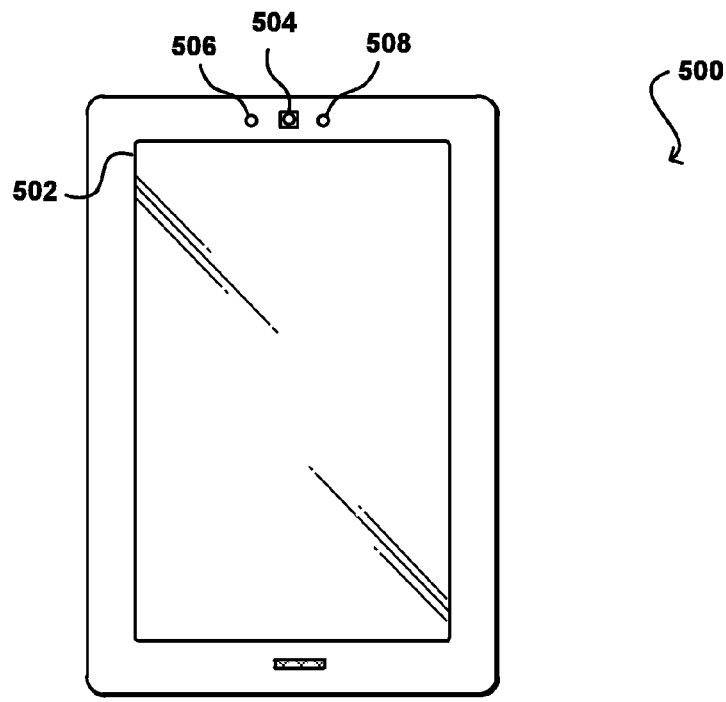
FIG. 5 illustrates an example computing device that can be used in accordance with various embodiments.

FIG. 5 illustrates an example computing device 500 that can be used to perform methods in accordance with various embodiments discussed and suggested herein. In this example, the device has at least one camera 504 or other such image capture elements that can be positioned at various locations, such as on the same side of the device as a display element 502, enabling the device to capture image information about a user of the device during typical operation where the user is at least partially in front of the display element 502. In this example, each capture element is a camera capable of capturing image information over a visible and/or infrared (IR) spectrum, and in at least some embodiments can select between visible and IR operational modes. It should be understood, however, that there can be fewer or additional elements of similar or alternative types in other embodiments, and that there can be combinations of cameras, infrared detectors, gesture sensors, and other such elements used with various devices.

In this example, a light sensor 506 is included that can be used to determine an amount of light in a general direction of objects to be captured and at least one illumination element 508, such as a white light emitting diode (LED) or infrared (IR) emitter, as discussed elsewhere herein, for providing illumination in a particular range of directions when, for example, there is insufficient ambient light determined by the light sensor or reflected IR radiation is to be captured. Various other elements and combinations of elements can be used as well within the scope of the various embodiments as should be apparent in light of the teachings and suggestions contained herein.

Figure 6:
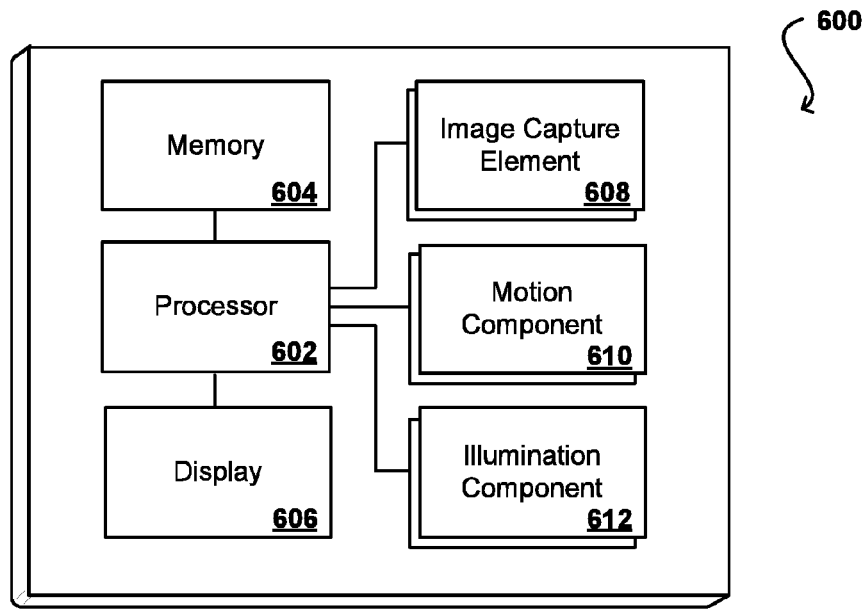
FIG. 6 illustrates an example configuration of components of a computing device such as that illustrated in FIG. 5.

In order to provide various functionality described herein, FIG. 6 illustrates an example set of basic components of a computing device 600, such as the device 500 described with respect to FIG. 5. In this example, the device includes at least one central processor 602 for executing instructions that can be stored in at least one memory device or element 604. As would be apparent to one of ordinary skill in the art, the device can include many types of memory, data storage or non-transitory computer-readable storage media, such as a first data storage for program instructions for execution by the processor 602, the same or separate storage can be used for images or data, a removable storage memory can be available for sharing information with other devices, etc. The device typically will include some type of display element 606, such as a touch screen, electronic ink (e-ink), organic light emitting diode (OLED) or liquid crystal display (LCD), although devices such as portable media players might convey information via other means, such as through audio speakers. In at least some embodiments, the display screen provides for touch or swipe-based input using, for example, capacitive or resistive touch technology.

As discussed, the device in many embodiments will include at least one image capture element 608, such as one or more cameras that are able to image a user, people, or objects in the vicinity of the device. An image capture element can include, or be based at least in part upon any appropriate technology, such as a CCD or CMOS image capture element having a determined resolution, focal range, viewable area, and capture rate. The image capture elements can also include at least one IR sensor or detector operable to capture image information for use in determining gestures or motions of the user. The example device includes at least one motion determining component 610, such as an electronic gyroscope used to determine motion of the device for assistance in input determination. The device also can include at least one illumination element 612, as may include one or more light sources (e.g., white light LEDs, IR emitters, or flashlamps) for providing illumination and/or one or more light sensors or detectors for detecting ambient light or intensity, etc.

The example device can include at least one additional input device able to receive conventional input from a user. This conventional input can include, for example, a push button, touch pad, touch screen, wheel, joystick, keypad, mouse, trackball, keypad or any other such device or element whereby a user can input a command to the device. These I/O devices could even be connected by a wireless infrared or Bluetooth or other link as well in some embodiments. In some embodiments, however, such a device might not include any buttons at all and might be controlled only through a combination of visual (e.g., gesture) and audio (e.g., spoken) commands such that a user can control the device without having to be in contact with the device.

Figure 7:
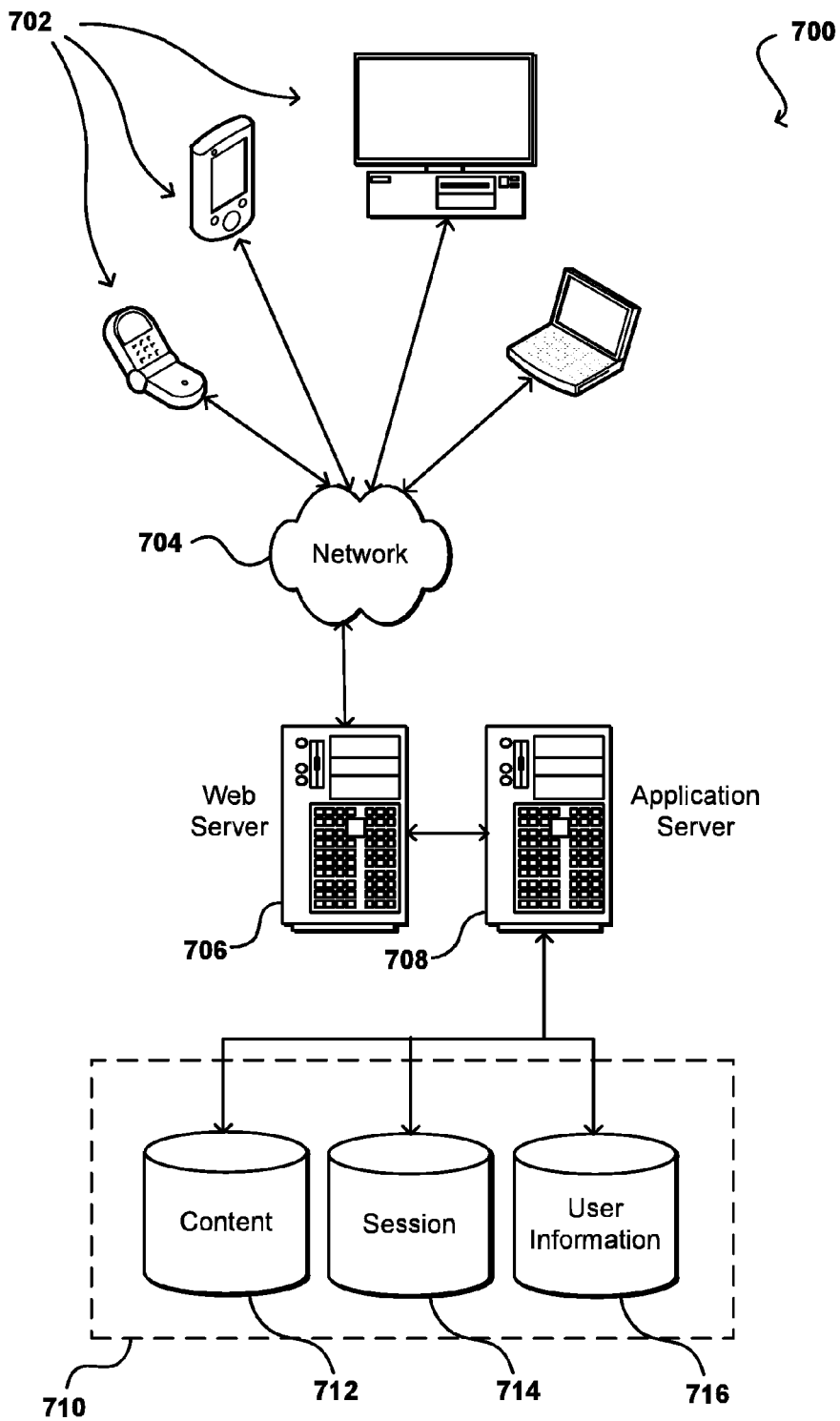
FIG. 7 illustrates an example environment in which various embodiments can be implemented.

As discussed, different approaches can be implemented in various environments in accordance with the described embodiments. For example, FIG. 7 illustrates an example of an environment 700 for implementing aspects in accordance with various embodiments. As will be appreciated, although a Web-based environment is used for purposes of explanation, different environments may be used, as appropriate, to implement various embodiments. The system includes an electronic client device 702, which can include any appropriate device operable to send and receive requests, messages or information over an appropriate network 704 and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network includes the Internet, as the environment includes a Web server 706 for receiving requests and serving content in response thereto, although for other networks, an alternative device serving a similar purpose could be used, as would be apparent to one of ordinary skill in the art.

The illustrative environment includes at least one application server 708 and a data store 710. It should be understood that there can be several application servers, layers or other elements, processes or components, which may be chained or otherwise configured, which can interact to perform tasks such as obtaining data from an appropriate data store. As used herein, the term "data store" refers to any device or combination of devices capable of storing, accessing and retrieving data, which may include any combination and number of data servers, databases, data storage devices and data storage media, in any standard, distributed or clustered environment. The application server 708 can include any appropriate hardware and software for integrating with the data store 710 as needed to execute aspects of one or more applications for the client device and handling a majority of the data access and business logic for an application. The application server provides access control services in cooperation with the data store and is able to generate content such as text, graphics, audio and/or video to be transferred to the user, which may be served to the user by the Web server 706 in the form of HTML, XML or another appropriate structured language in this example. The handling of all requests and responses, as well as the delivery of content between the client device 702 and the application server 708, can be handled by the Web server 706. It should be understood that the Web and application servers are not required and are merely example components, as structured code discussed herein can be executed on any appropriate device or host machine as discussed elsewhere herein.

The data store 710 can include several separate data tables, databases or other data storage mechanisms and media for storing data relating to a particular aspect. For example, the data store illustrated includes mechanisms for storing content (e.g., production data) 712 and user information 716, which can be used to serve content for the production side. The data store is also shown to include a mechanism for storing log or session data 714. It should be understood that there can be many other aspects that may need to be stored in the data store, such as page image information and access rights information, which can be stored in any of the above listed mechanisms as appropriate or in additional mechanisms in the data store 710. The data store 710 is operable, through logic associated therewith, to receive instructions from the application server 708 and obtain, update or otherwise process data in response thereto. In one example, a user might submit a search request for a certain type of item. In this case, the data store might access the user information to verify the identity of the user and can access the catalog detail information to obtain information about items of that type. The information can then be returned to the user, such as in a results listing on a Web page that the user is able to view via a browser on the user device 702. Information for a particular item of interest can be viewed in a dedicated page or window of the browser.

Each server typically will include an operating system that provides executable program instructions for the general administration and operation of that server and typically will include computer-readable medium storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 7. Thus, the depiction of the system 700 in FIG. 7 should be taken as being illustrative in nature and not limiting to the scope of the disclosure.

The various embodiments can be further implemented in a wide variety of operating environments, which in some cases can include one or more user computers or computing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system can also include a number of workstations running any of a variety of commercially-available operating systems and other known applications for purposes such as development and database management. These devices can also include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as TCP/IP, OSI, FTP, UPnP, NFS, CIFS and AppleTalk. The network can be, for example, a local area network, a wide-area network, a virtual private network, the Internet, an intranet, an extranet, a public switched telephone network, an infrared network, a wireless network and any combination thereof.

In embodiments utilizing a Web server, the Web server can run any of a variety of server or mid-tier applications, including HTTP servers, FTP servers, CGI servers, data servers, Java servers and business application servers. The server(s) may also be capable of executing programs or scripts in response requests from user devices, such as by executing one or more Web applications that may be implemented as one or more scripts or programs written in any programming language, such as Java®, C, C# or C++ or any scripting language, such as Perl, Python or TCL, as well as combinations thereof. The server(s) may also include database servers, including without limitation those commercially available from Oracle®, Microsoft®, Sybase® and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keypad, controller, touch-sensitive display element or keypad) and at least one output device (e.g., a display device, printer or speaker). Such a system may also include one or more storage devices, such as disk drives, optical storage devices and solid-state storage devices such as random access memory (RAM) or read-only memory (ROM), as well as removable media devices, memory cards, flash cards, etc.

Such devices can also include a computer-readable storage media reader, a communications device (e.g., a modem, a network card (wireless or wired), an infrared communication device) and working memory as described above. The computer-readable storage media reader can be connected with, or configured to receive, a computer-readable storage medium representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computer-implemented method, comprising:
    capturing image information using a camera of a computing device;
    analyzing, using a processor of the computing device, the image information to generate analyzed image information;
    locating a position of a user with respect to the computing device based at least in part upon the analyzed image information;
    determining, using the processor of the computing device, a display orientation with which to display content based at least in part upon the position of the user with respect to the computing device, the display orientation associated with a display orientation confidence value that indicates a first level of confidence of an accuracy of the display orientation with which to display the content on the computing device;
    determining that the display orientation confidence value does not meet a first confidence threshold;
    detecting, in response to the display orientation confidence value not meeting the first confidence threshold, a device orientation of the computing device based at least in part upon motion data captured by a motion sensor of the computing device, the device orientation associated with a device orientation confidence value that indicates a second level of confidence of an accuracy of the device orientation of the computing device;
    determining that the device orientation confidence value meets a second confidence threshold;
    updating, in response to the device orientation confidence value meeting the second confidence threshold, the display orientation with a last-determined display orientation based at least in part upon the device orientation and the position of the user, the last-determined display orientation replacing the display orientation; and
    displaying the content using the last-determined display orientation such that the content is viewable from a determined orientation with at least a threshold level of quality.

2. The computer-implemented method of claim 1, further comprising:
    determining that the device orientation confidence value does not meet the second confidence threshold;
    updating, in response to the device orientation confidence value not meeting the second confidence threshold, the position of the user with a current position of the user based at least in part on the analyzed image information and the motion data, the current position of the user replacing the position of the user;
    updating the last-determined display orientation with a current display orientation based at least in part on the current position of the user, the current display orientation replacing the last-determined display orientation; and
    displaying the content using the current display orientation.

3. The computer-implemented method of claim 1, further comprising:
    determining that the device orientation confidence value does not meet the second confidence threshold;
    identifying, in response to the device orientation confidence value not meeting the second confidence threshold, a location of an object in a field of view of the camera with respect to the camera based at least in part on the analyzed image information;
    determining a location of the computing device with respect to the location of the object;
    updating the last-determined display orientation with a current display orientation based at least in part upon the location of the computing device, the current display orientation replacing the last-determined display orientation; and
    displaying the content using the current display orientation.

4. The computer-implemented method of claim 1, further comprising:
    determining that the device orientation confidence value does not meet the second confidence threshold;
    capturing, in response to the device orientation confidence value not meeting the second confidence threshold, audio data using a microphone of the computing device;
    analyzing the audio data to generate analyzed audio data;
    updating the last-determined display orientation with a current display orientation based at least in part upon the analyzed audio data, the current display orientation replacing the last-determined display orientation; and
    displaying the content using the current display orientation.

5. The computer-implemented method of claim 4, wherein analyzing the audio data includes at least one of triangulating a position of a person producing the audio data or performing voice recognition on the audio data.

6. The computer-implemented method of claim 4, further comprising:
    detecting that the motion sensor is no longer capturing motion data;

capturing and analyzing additional image information using the camera to generate analyzed additional image information;

capturing and analyzing additional audio data using the microphone to generate analyzed additional audio data;

updating the last-determined display orientation with a current display orientation based at least in part upon at least one of the analyzed additional image information or the analyzed audio data, the current display orientation replacing the last-determined display orientation; and displaying the content using the current display orientation.

7. The computer-implemented method of claim 1, further comprising:

determining a perspective of the user based at least in part on a line of sight from an eye of the user to the computing device based at least in part upon the analyzed image information;

updating the last-determined display orientation with a current display orientation based at least in part upon the perspective of the user, the current display orientation replacing the last-determined display orientation; and displaying the content using the current display orientation.

8. A computing device, comprising:

a device processor;

a camera;

a display screen;

a motion sensor; and a memory device comprising instructions executable by the device processor to cause the computing device to:

capture image information using the camera;

analyze the image information, using the device processor, to generate analyzed image information;

determine a position of a user with respect to the computing device based at least in part upon the analyzed image information;

determine, using the device processor, a display orientation with which to display content based at least in part upon the position of the user with respect to the computing device, the display orientation associated with a display orientation confidence value that indicates determined first level of confidence of an accuracy of the display orientation with which to display the content on the display screen;

determine that the display orientation confidence value does not meet a first confidence threshold;

detect, in response to the display orientation confidence value not meeting the first confidence threshold, a device orientation of the computing device based at least in part upon motion data captured by the motion sensor, the device orientation associated with a device orientation confidence value that indicates a second level of confidence of an accuracy of the device orientation of the display screen of the computing device;

determine that the device orientation confidence value meets a second confidence threshold;

update the display orientation with a last-determined display orientation based at least in part upon the device orientation and the position of the user, the last-determined display orientation replacing the display orientation; and display the content on the display screen using the last-determined display orientation such that the content is viewable from a determined orientation with at least a threshold level of quality.

9. The computing device of claim 8, wherein the memory device further comprises instructions executable by the device processor to cause the computing device to:

determine that the display orientation confidence value meets the first confidence threshold, the display orientation being the last-determined display orientation; and display the content with the last-determined display orientation.

10. The computing device of claim 8, further comprising:

an image buffer configured to:

store the image information for analysis, wherein analyzing the image information generates analyzed image information;

store the analyzed image information; and delete, in response to the analyzed image information being stored, the image information after the analysis is completed.

11. The computing device of claim 8, wherein the camera is a first camera, the computing device further comprising a second camera, the second camera having a lower resolution than the first camera of the computing device, the second camera used to capture the image information for analysis to generate analyzed image information.

12. The computing device of claim 8, wherein the image information or the analyzed image information is not accessible by the user or a third party.

13. The computing device of claim 8, further comprising:

a light sensor configured to:

determine an amount of light in a field of view from the computing device; and determine the amount of light is below a minimum threshold sufficient for the camera to capture the image information; and an illumination element operable to provide, in response to the amount of light is below the minimum threshold, illumination for the camera to capture the image information.

14. A non-transitory computer-readable storage medium storing instructions executable by a device processor of a computing device, causing the computing device to:

capture image information using a camera of the computing device;

analyze the image information, using the device processor, to generate analyzed image information;

locate a position of a user with respect to the computing device based at least in part upon the analyzed image information;

determine, using the device processor, a display orientation with which to display content based at least in part upon the position of the user, the display orientation associated with a display orientation confidence value that indicates determined first level of confidence of an accuracy of the position of the user;

determine that the display orientation confidence value does not meet a first confidence threshold;

detect, in response to the display orientation confidence value not meeting the first confidence threshold, a device orientation of the computing device based at least in part on motion data captured by a motion sensor of the computing device, the device orientation associated with a device orientation confidence value that indicates a second level of confidence of an accuracy of the device orientation of a display screen of the computing device;

determine that the device orientation confidence value meets a second confidence threshold;

update, in response to the device confidence value meeting the second confidence threshold, the display orientation with a last-determined display orientation based at least in part upon the device orientation and the position of the user, the last-determined display orientation replacing the display orientation; and display the content on the display screen using the last-determined display orientation such that the content is viewable with at least a threshold level of quality.

15. The non-transitory computer-readable storage medium of claim 14, wherein the instructions executable by at least one processor of the computing device further cause the computing device to:

determine a likely display orientation based at least in part on previously determined display orientations;

update the last-determined display orientation with the likely display orientation, the likely display orientation replacing the last-determined display orientation; and display the content using the likely display orientation.

16. The non-transitory computer-readable storage medium of claim 14, wherein the instructions executable by at least one processor of the computing device further cause the computing device to:

update a scale of a portion of the content to be displayed based at least in part upon the position of the user.

17. The non-transitory computer-readable storage medium of claim 14, wherein the instructions executable by at least one processor of the computing device further cause the computing device to:

determine that the device orientation confidence value does not meet the second confidence threshold;

update, in response to the device orientation confidence value not meeting the second confidence threshold, the position of the user with a current position of the user based at least in part on the analyzed image information and the motion data, the current position of the user replacing the position of the user;

determine geometry information about a surrounding area of the computing device based at least in part on the current position of the user and the analyzed image information;

update the last-determined display orientation with a current display orientation based at least in part on the geometry information about the surrounding area, the current display orientation replacing the last-determined display orientation; and display the content based at least in part upon the current display orientation.

18. The non-transitory computer-readable storage medium of claim 14, wherein the instructions executable by at least one processor of the computing device further cause the computing device to:

determine that the device orientation confidence value does not meet the second confidence threshold;

identify, in response to the device orientation confidence value not meeting the second confidence threshold, a location of an object in a field of view of the camera with respect to the computing device;

determine a location of the computing device based at least in part upon the location of the object with respect to the computing device;

update the last-determined display orientation with a current display orientation based at least in part on the location of the computing device, the current display orientation replacing the last-determined display orientation; and display the content based at least in part upon the current display orientation.

19. The non-transitory computer-readable storage medium of claim 14, wherein the instructions executable by at least one processor of the computing device further cause the computing device to:

determine that the device orientation confidence value does not meet the second confidence threshold;

capture, in response to the device orientation confidence value not meeting the second confidence threshold, audio data using a microphone of the computing device;

analyze the audio data to generate analyzed audio data;

update the last-determined display orientation with a current display orientation based at least in part on the analyzed audio data, the current display orientation replacing the last-determined display orientation; and display the content based at least in part upon the current display orientation.

20. The non-transitory computer-readable storage medium of claim 19, wherein analyzing the audio data includes at least one of triangulating a relative position of the user producing the audio data or performing voice recognition on the audio data.

* * * * *